United States Patent [19]

Buhrer

[11] Patent Number: 4,589,726
[45] Date of Patent: May 20, 1986

[54] OPTICAL FIBER ROTARY SWITCH

[75] Inventor: Carl F. Buhrer, Framingham, Mass.

[73] Assignee: GTE Laboratories Incorporated, Waltham, Mass.

[21] Appl. No.: 607,533

[22] Filed: May 7, 1984

[51] Int. Cl.[4] .................................. G02B 6/36
[52] U.S. Cl. .......................... 350/96.20; 350/96.15
[58] Field of Search ............... 350/96.15, 96.16, 96.19, 350/96.20

[56] References Cited

U.S. PATENT DOCUMENTS 4,432,601  2/1984  Mannschke ................. 350/96.19

FOREIGN PATENT DOCUMENTS 2830261  1/1980  Fed. Rep. of Germany ... 350/96.20
0087105  7/1980  Japan ........................... 350/96.20
0070502  6/1981  Japan ........................... 350/96.20
0156802  12/1981 Japan ........................... 350/96.20

OTHER PUBLICATIONS

"Nonblocking 8×8 Optical Matrix Switch for Fibre-Optic Communications," Elec. Lett. 16(11), 422–423 (1980) by Minowa et al.

Primary Examiner—William L. Sikes
Assistant Examiner—Akm E. Ullah
Attorney, Agent, or Firm—Fred Fisher

[57] ABSTRACT

An electro-mechanical optical fiber rotary switch provides for latched reconnection of two optical paths among four optical fiber ports of a 2×2 switching array. A right isosceles triangular optical prism is used in the switch, the prism being rotated 90° in either direction to change the switch position.

7 Claims, 3 Drawing Figures

OPTICAL FIBER ROTARY SWITCH

BACKGROUND OF THE INVENTION

1. Field of the Invention

This invention relates to an optical fiber rotary switch, and, in particular, to an electromechanical optical fiber rotary switch which provides for latched reconnection of two optical paths among four optical fiber ports of a 2×2 switching array. Accordingly, it is a general object of this invention to provide new and improved switches of such character.

2. Introduction

There are a variety of applications, in fiber optics communications systems, for matrix type switches that are capable of reconnecting a set of n input lines to n output lines. A 2×2 matrix array switch is useful, not only as a building block for implementing a larger array, but also individually in such situations where a selection between only two alternative fiber circuits is desired. A significant example of such a situation is at the ends of a long fiber communications link where two laser transmitters or two diode receivers may be located, one actively connected to the link while the other is in an active standby mode ready to replace a failed device. The fourth port of such a 2×2 matrix switch would then permit monitoring of the standby device. In such an application, the switch would need to be thrown only rarely and a switching time of 10 ms to 100 ms would be quite acceptable.

3. Description of the Prior Art

As a means of complying with the duty of disclosure set forth in 37 CFR 1.56, the following listing of publications may be considered to be pertinent. A concise explanation of the relevance of each of the listed items is indicated by the references set forth in the following paragraphs with the various cited items being indicated by superscript reference numerals. This disclosure statement shall not be construed as a representation that a search has been made or that no other material information as defined in 37 CFR 56(a) exists.

1. P.G. Hale and R. Kompfner, "Mechanical Optical Fibre Switch," Elec. Lett. 12(15), 388 (1976).

2. M. Johnson and R. Ulrich, "Fiber-Optic Relay," Appl. Phys. Lett. 31(10), 675–676 (1977).

3. M. Stockman, G. Winzer, and E. Grassl, "Rigid Reed-Type Routing Switch for Multimode Optical Fibers," Fiber and Integ. Opt. 3(2–3), 237–251 (1980).

4. T. Ebato, T. Kajiwara, and S. Kobayashi, "Mechanical Fibre Optic Switching Using P.V.D.F. Bimorph," Elec. Lett. 16(22), 829–830 (1980).

5. A. Carenco and L. Menigaux, "InP Electro-Optic Directional Coupler," Appl. Phys. Lett. 40(8), 653–655 (1982).

6. M. Kondo, Y. Ohta, M. Fujiwara, and M. Sakaguchi, "Integrated Optical Switch Matrix for Single Mode Fiber Networks," IEEE J. of Quant. Elec. QE-18(10), 1759–1765 (1982).

7. M. Haruna and J. Koyama, "Thermooptic Deflection and Switching in Glass," Appl. Opt. 21(19), 3461–3465 (1982).

8. Y. Fujii, J. Minowa, T. Aoyama, and K. Doi, "Low Loss 4×4 Optical Matrix Switch for Fiber-Optic Communications," Elec. Lett. 15(14), 427–428 (1979).

9. J. Minowa, Y. Fujii, Y. Nagata, T. Aoyama, and K. Doi, "Nonblocking 8×8 Optical Matrix Switch for Fibre-Optic Communications," Elec. Lett. 16(11), 422–423 (1980).

10. R. Watanabe and K. Asatani, "1×2 Optical Switch Using New Type of Pentagonal Prism," Elec. Lett. 16(7), 257–259 (1980).

Various optical fiber switches have been devised in the past. Some switches[1-4] electromechanically recouple the end of one fiber alternatively to the ends of two other fibers. These have been most successful with multimode fibers where the alignment is not as critical as with single mode fibers. In others[5-7], the light from the fibers is coupled into a planar waveguide system in thin film devices where its path is controlled by means of an electro-optic or thermo-optic effect. Most of these switches require the light from the fiber to be polarized for proper operation; however, with the exception of thermo-optic devices, they operate at very high speeds.

In another class of switches for optical fibers, light can be manipulated in free space after emerging from the fiber and being focused into a parallel beam by a self-aligning lens connector device, such as disclosed and claimed in U.S. Pat. No. 4,421,383, issued Dec. 20, 1983, to Carlsen, and assigned to the common assignee of this application. Such a connector can include, in one small part, a conical fiber alignment port and a lens surface to focus the wave into a parallel beam, such as disclosed in pending U.S. patent application No. 454,943, "Optical Fiber Centering Device", filed Jan. 3, 1983, by Paul Melman and W. John Carlsen, and assigned to the common assignee of this application, a continuation-in-part of U.S. patent application Ser. No. 223,192, filed Jan. 7, 1981 now patent No. 4,391,487. Use of such connectors on opposite sides of a free space optical switch greatly relaxes the lateral alignment requirements of the assembly.

Several such free-space beam switches using electromechanically driven prisms have been described. In one[8], two parallel input beams switch output positions when a rhombic glass prism is inserted into their paths so as to cause them to cross each other. A pair of electromagnets are required to move the prism into and out of the beam switching position. In another[9], a square array of pentagonal prisms is used to implement an 8×8 switch matrix. In both cases, a linear prism drive that maintains accurate orientational alignment is required. In still another[10], a pentagonal prism is described that relieves the alignment problem while giving a fixed 90° beam deviation.

SUMMARY OF THE INVENTION

Another object of this invention is to provide a new and improved 2×2 optical matrix switch acting on two free-space beams coupled to and from optical fibers with lens connectors.

Still another object of this invention is to provide for a new and improved switching action using a single prism element that rotates about a single axis and that is translationally fixed.

Yet another object of this invention can provide for a new and improved switching action by a latched 90° rotation utilizing a single rotary solenoid while simultaneously utilizing no power while the optical switch is in a stable position.

In accordance with one aspect of the invention, apparatus for switching light beams from a first optical fiber and a second optical fiber, alternately, onto a third optical fiber and a fourth optical fiber, respectively, and onto the fourth optical fiber and the third optical fiber, respectively, is set forth. A first means is coupled to the first optical fiber for causing light emerging therefrom to be focused into a first expanded parallel beam along a first central axis. A second means is coupled to the second optical fiber for causing light emerging therefrom to be focused into a second expanded parallel beam along a second central axis. A third means is coupled to the third optical fiber for causing a third expanded parallel beam of light along a third central axis to be focused onto the third optical fiber. A fourth means is coupled to the fourth optical fiber for causing a fourth expanded parallel beam of light along a fourth central axis to be focused onto the fourth optical fiber. The four recited means are so oriented that the four recited beams are oriented parallel to each other, that their axes are parallel to each other, and a plane oriented perpendicular to the axes intersects the axes at a first point, a second point, a third point, and a fourth point, respectively. The points form corners of a square with the first and the second points forming opposite diagonal corners of the square, and the third and the fourth points forming the remaining opposite diagonal corners of the square. A right isosceles triangular optical prism has a pair of lateral plane face surfaces of equal size which join together at right angles along a common apical edge. The surfaces are coupled together with a hypotenuse face which is parallel to the edge, the face having an area in excess of the area of the square. Means are provided for orienting the prism so that the hypotenuse face is parallel to the plane, so that a rotational axis drawn through the apical edge and the center of the square is perpendicular to the plane, and so that a line drawn from the first point to the third point is parallel to the apical edge. Means are provided for rotating the prism 90° about its rotational axis so that the hypotenuse face is parallel to the plane, so that the rotational axis drawn through the apical edge and the center of the square is perpendicular to the plane, and so that a line drawn from the first point to the fourth point is parallel to the apical edge. In accordance with certain features of the invention, each of the four means can comprise an expanded beam connector device having a fiber alignment port, a focusing lens surface, and a reference surface. All of the reference surfaces can be aligned in a common plane. The hypotenuse face can be antireflection-coated.

In accordance with another aspect of the invention, the optical fiber rotary switching apparatus can include a base plate have a raised planar surface that is circular about a rotational axis. The surface can have a first square array of four holes therethrough, centered about the rotational axis. The surface can have a second square array of four detents thereon, centered about the rotational axis. The second square array is larger than the first square array. A first optical fiber connector, adapted to be coupled to a first optical fiber, causes light emerging therefrom to be focused into a first expanded parallel beam along a first central axis. The first connector is so oriented that the first beam passes through one of the four holes. A second optical fiber connector, adapted to be coupled to a second optical fiber, causes light emerging therefrom to be focused into a second expanded parallel beam along a second central axis. The second connector is so oriented that the second beam passes through a second of the four holes. The one hole and the second hole are oriented at opposite diagonal corners of the first square array. A third optical fiber connector, adapted to be coupled to a third optical fiber, causes a third expanded parallel beam of light along a third central axis to be focused onto the third optical fiber. The third connector is so oriented that the third beam passes through a third of the four holes. A fourth optical fiber connector, adapted to be coupled to a fourth optical fiber, causes a fourth expanded parallel beam of light along a fourth central axis to be focused onto the fourth optical fiber. The fourth connector is so oriented that the fourth beam passes through a fourth of the four holes. The third and the fourth holes are oriented at the other opposite diagonal corners of the first square array. A right isosceles triangular optical prism has a pair of lateral plane face surfaces of equal size that join together at right angles along a common apical edge. The lateral surfaces are coupled together with a hypotenuse face which is parallel to the edge. The hypotenuse face has an area in excess of the area of the first square array. A cylindrical prism carrier, adapted to rotate about the rotational axis, has a cavity therein for receiving the prism such that the apical edge intersects the rotational axis and such that the hypotenuse face is parallel to the raised surface but not contacting the raised surface. The prism carrier contains a pair of spring-biased balls, spaced apart a distance equal to the diagonal of the second square array, for alternating engagement with two of the four detents on the raised surface. An annular shell is provided for fitting about the planar surface and for laterally constraining the prism carrier. In accordance with certain features of the invention, the apparatus can further include a 90° rotary solenoid and a ratchet mechanism such that each excitation of the solenoid causes the prism carrier to rotate 90° and then align itself with the detents on the second array. The detents can be conical.

In accordance with yet another aspect of the invention, a solenoid activated optical fiber switch includes a first means for causing light from a first optical fiber to be focused into a first expanded parallel beam of light along a first central axis. A second means causes light from a second optical fiber to be focused into a second expanded parallel beam along a second central axis. A third means causes a third expanded parallel beam of light along a third central axis to be focused onto a third optical fiber. A fourth means causes a fourth expanded parallel beam of light along a fourth central axis to be focused onto a fourth optical fiber. The four means are so oriented that the four beams are oriented parallel to each other, that their axes are parallel to each other, and that a plane oriented perpendicular to the axes intersects the axes at four points, respectively, and that the points form corners of a square with the first and second points forming opposite diagonal corners of the square, and the third and the fourth points forming the remaining opposite diagonal corners of the square. A right isosceles triangular optical prism has a pair of lateral plane face surfaces of equal size which join together at right angles along a common apical edge. The surfaces are coupled together with a hypotenuse face which is parallel to the edge. The hypotenuse face has an area in excess of the area of the square. A 90° rotary solenoid is coupled to the prism for rotating the prism to aligned states where the apical edge is parallel to alternate sides of the square.

BRIEF DESCRIPTION OF THE DRAWINGS

Other objects, advantages and features of this invention, together with its construction and mode of operation, will become more apparent from the following description, when read in conjunction with the accompanying drawing, in which.

DESCRIPTION OF PREFERRED EMBODIMENT(S)

Figure 1A:
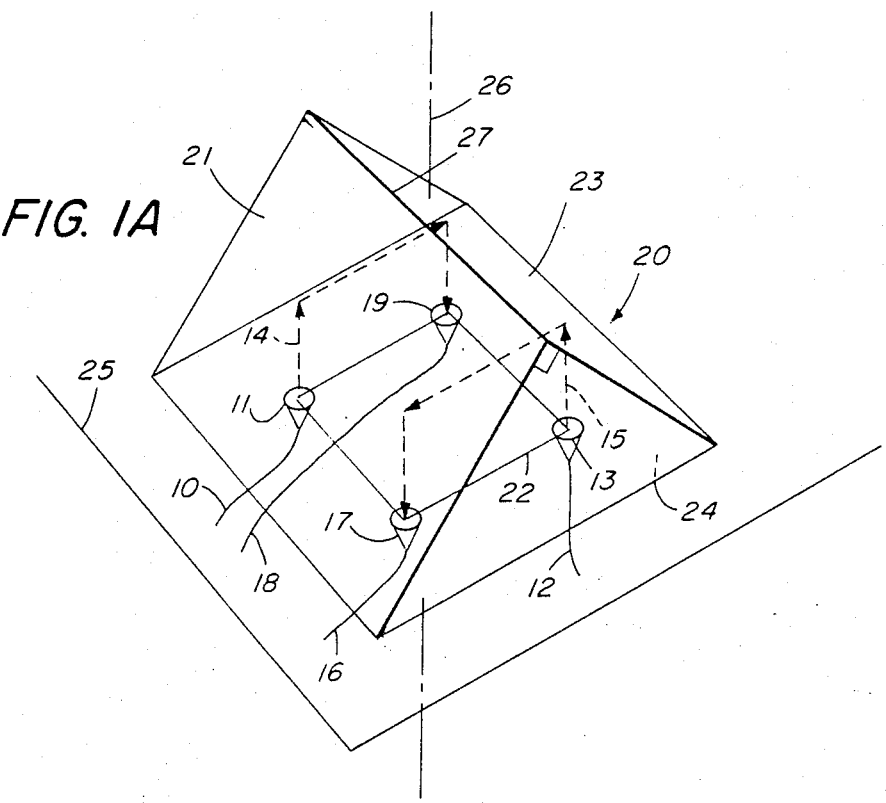
FIGS. 1A and 1B illustrate the optical geometry of the present invention showing a right isosceles triangular prism in two different positions about a common rotational axis.
Figure 1B:
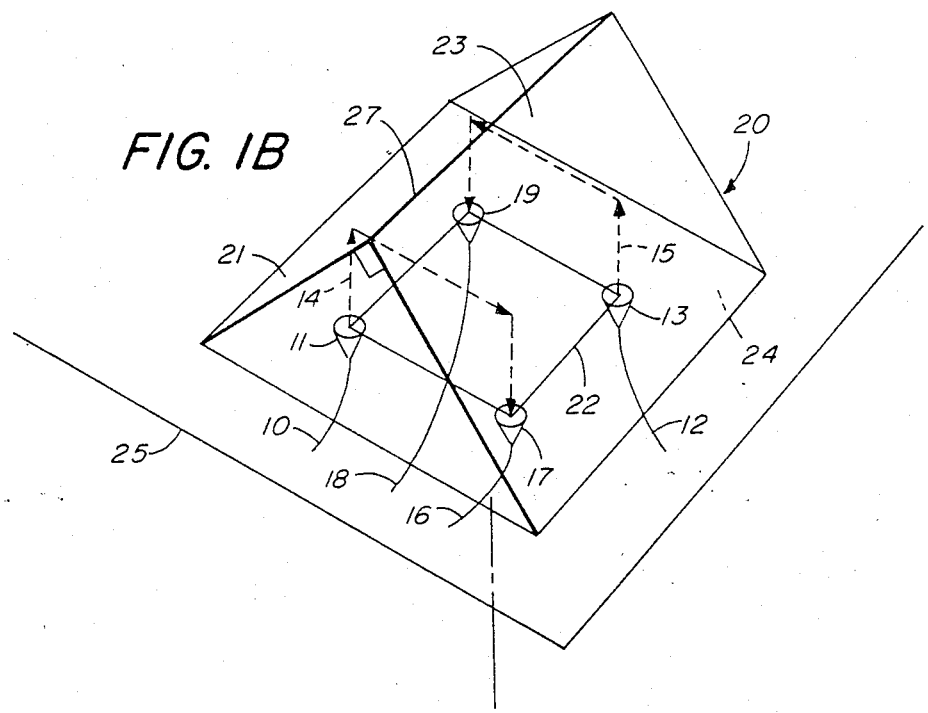

The optical geometry of this invention is best shown by FIGS. 1A and 1B.

Referring to FIG. 1A, there is illustrated two input fibers 10, 12 that are respectively terminated in optical lens input connectors 11, 13. In similar fashion, two output fibers 16, 18 are connected to identical optical lens output connectors 17, 19. All four connectors 11, 13, 17, 19 are oriented with their axes parallel to each other and substantially oriented at corners of a square 22 in a plane 25 such that the input connectors 11, 13 are at opposite corners of the square 22 and that the output connectors 17, 18 are at the remaining opposite corners of the square. A right angle optical prism 20 is positioned with its antireflection-coated hypotenuse face 24 parallel to, and a short distance above, the plane 25. The prism 20 is rotatable about an axis 26, which axis 26 is perendicular to the plane 25 and passes through the center of the square 22. The prism 20 is otherwise translationally and rotationally fixed such that its apical edge 27 is perpendicular to, and is bisected by, the axis 26.

In operation as a switch, the optical prism 20 can be rotated among the four mutually perpendicular positions for which the apical edge 27 is parallel to one side of the square 22. Because of the two-fold rotational symmetry of the prism 20 about the axis 26, opposite rotational positions are identical and the switch can always be reversed by one 90° rotation in a single direction. One unique orientation is depicted in FIG. 1A; the other unique orientation is depicted in FIG. 1B. In one of those two unique orientations as depicted in FIG. 1A, light arriving on the input fiber 10 is expanded by the optical lens connector 11 and is directed into a collimated beam 14, which beam 14 enters the prism 20 normal to its hypotenuse face 24. The collimated beam 14 is totally reflected twice by the two faces 21, 23 of the prism 20 (which two faces 21, 23 are at right angles to each other) and the collimated beam 14 then enters the connector 19 to be outputted on the output fiber 18. Coincidentally therewith, light arriving on the input fiber 12 is expanded into a collimated beam 15 by the connector 13. The collimated beam 15 also enters the prism 20 normal to its hypotenuse face 24 and is totally reflected twice by the two prism faces 23, 21, the beam 15 then entering the connector 17 to be outputted onto the output fiber 16, all as illustrated by the configuration that is depicted in FIG. 1A.

After rotation of the prism 20 in either direction by 90° about the rotational axis 26, as depicted in FIG. 1B, the apical edge 27 becomes parallel to the other two sides of the square 22. In this switched orientation, light arriving from the input fiber 10, and expanded by the connector 11 into a collimated beam 14, is reflected twice within the optical prism 20 but, this time, onto the optical lens connector 17 to be outputted onto the output fiber 16. In this configuration, as depicted in FIG. 1B, light from the input fiber 12 is expanded by the optical lens connector 13 into the collimated beam 15 and is reflected twice within the prism 20 onto the optical lens connector 19 to be outputted onto the output fiber 18. Thus, the input fiber 10 is connected alternatively to the output fibers 18 or 16 (FIG. 1A or FIG. 1B, respectively) while the other input fiber 12 is connected to the remaining output fiber.

Figure 2:
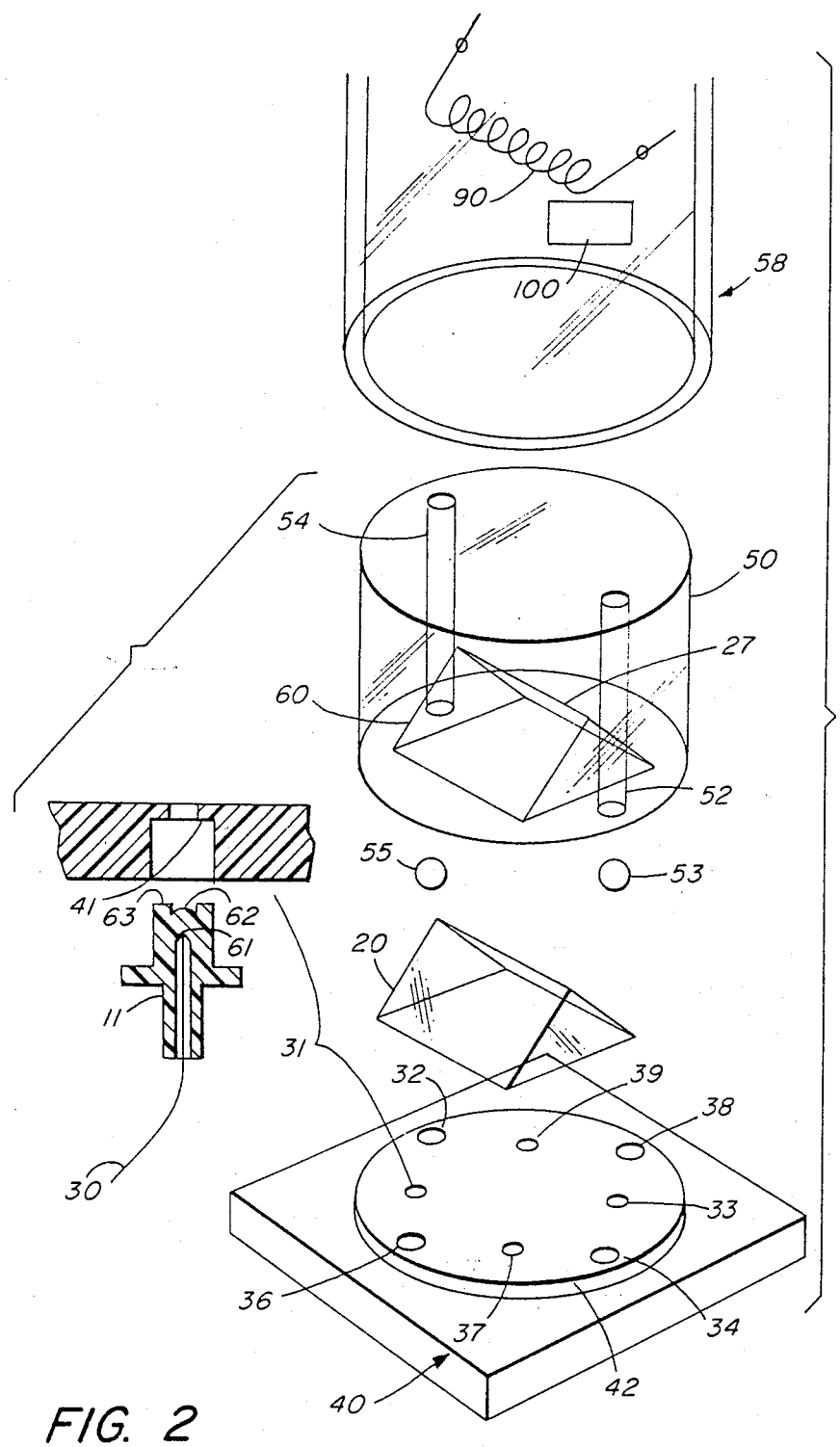
FIG. 2 is an exploded perspective view illustrating mechanical structure for providing the precise rotation of a prism in accordance with the optical geometry of FIGS. 1A and 1B.

FIG. 2 depicts an exploded view of the mechanical structure for providing the precise rotation of the prism 20 according to the optical geometry of FIGS. 1A and 1B.

A baseplate 40 is provided with a raised circular and highly planar surface 42 upon which a cylindrical prism carrier 50 rotates. An outer shell 58, in the form of an annulus, fits around the planar surface 42 and laterally constrains the prism carrier 50 while permitting the prism carrier 50 to be free to rotate within the shell 58 about the cylindrical axis 26. The prism 20 is affixed into a cavity 60 in the lower surface of the carrier 50 such that its apical edge 27 intersects the cylinder axis 26 and such that its hypotenuse face 24 is parallel to the surface 42 but not quite contacting it. Voids are provided adjacent to the reflecting surfaces of the prism 20 so as not to frustrate total internal reflection. To achieve total internal reflection, the refractive index of the optical prism must be greater than the cosecant of the 45° angle of incidence or greater than 1,4142. Fused quartz and most optical glasses are quite suitable prism materials. Utilization of total internal reflection is preferred as it avoids potential intensity losses at silvered or other reflection coated surfaces.

Two square arrays are centered on the rotational axis 26 of the surface 42. There is one square array of four lens connector holes 31, 33, 37, 39 through which connectors 11, 13, 17, 19 couple the collimated beams.

Four conical detents 32, 34, 36, 38 are located in the other square array centered on the axis 26 of the surface 42. These conical detents 32, 34, 36, 38 serve to align the prism carrier 50 at one of four rotational positions 90° apart by means of two spherical balls 53, 55 which slide freely in orifices 52, 54 within the prism carrier 50. The balls 53, 55 are pressed downwardly by two small springs (not shown) within the orifices 52, 54 and cause the prism carrier 50 to reach rotational alignment with the balls 53, 55 at the centers of the conical detents 32, 34, 36, 38. When so aligned, the apical edge 27 is parallel to one of the four sides of the square array of lens connector holes 31, 33, 37, 39.

The lens connectors 11, 13, 17, 19 are molded of optical plastic and designed such that when a cleaved optical fiber 30, as depicted in FIG. 2, is affixed inside at a focal point 61, a collimated beam is produced by its front convex lens surface 62. Concentric with this lens surface 62 and forward from it is a reference plane surface 63 that defines the direction of the collimated beam (i.e., the beam direction is perpendicular to the reference surface 63). The front reference surfaces 63, of each connector 11, 13, 17, 19, are pressed against a similar flat surface 41 at the bottom of each lens connector hole 31, 33, 37, 39. These four surfaces 41 are accurately parallel to the surface 42. The prism carrier 50 is held in contact with the surface 42 by a separate central spring (not shown). The actual mechanism used to rotate the prism 20 90° between switch positions is diagrammatically, but not specifically, illustrated. Such switching action can be manually or electrically operated. In the latter case, as depicted in FIG. 2, a 90° rotary solenoid 90 is utilized through a ratchet mechanism 100, such that each excitation of the driving solenoid 90 causes the prism carrier 50 to rotate 90° and then align itself with the detent positions.

The coupling efficiency of the 2×2 matrix rotary switch described hereinabove depends upon the inherent losses of the connectors 11, 13, 17, 19 when operated at a spacing equivalent to the optical path throughout the switch, the reflection losses on the coated hypotenuse face of the prism 20, and on various angular and lateral misalignments. Some of the angular alignment requirements are satisfied by the use of a single glass right angle prism 20 which can be manufactured quite accurately. The prism 20 should be mounted so that its hypotenuse face and its apical edge 27 remain parallel to the surface 42 as the prism 20 is rotated. Furthermore, the reference faces 63 of each optical connector 11, 13, 17, 19 should be parallel to the surface 42 also. The lateral alignment is not as critical as it only determines the degree of overlap between the two collimated beams. The lateral alignment requires that the apical edge 27 of the prism 20 intersect the rotation axis 26 and that the lens connector holes 31, 33, 37, 39 and the alignment detents 32, 34, 36, 38 be accurately located.

Thus, in summary, there has been described a new and improved implementation of an optical fiber 2×2 matrix switch utilizing a single right angle prism. In particular, a new and improved optical fiber 2×2 matrix rotary switch has been set forth that requires only a single 90° rotation in either direction for reversal. Furthermore, a new and improved solenoid activated optical fiber switch that latches in either state, utilizing merely one solenoid for switching states, is set forth.

Other modifications will suggest for themselves to those skilled in the art without departing from the spirit and scope of this invention. For example, various expanded beam connectors can be utilized other than those cited hereinabove.

What is claimed is:

1. Apparatus for switching light beams from a first optical fiber and a second optical fiber, alternately, onto a third optical fiber and a fourth optical fiber, respectively, and onto said fourth optical fiber and said third optical fiber, respectively, comprising
   first means coupled to said first optical fiber for causing light emerging therefrom to be focused into a first expanded parallel beam along a first central axis;
   second means coupled to said second optical fiber for causing light emerging therefrom to be focused into a second expanded parallel beam along a second central axis;
   third means coupled to said third optical fiber for causing a third expanded parallel beam of light, along a third central axis, to be focused onto said third optical
   fourth means coupled to said fourth optical fiber for causing a fourth expanded parallel beam of light, along a fourth central axis, to be focused onto said fourth optical fiber,
   said first means, said second means, said third means, and said fourth means being so oriented that said first beam, said second beam, said third beam, and said fourth beam are oriented parallel to each other, that said axes are parallel to each other, and that a plane oriented perpendicular to said axes intersects said axes at a first point, a second point, a third point, and a fourth point, respectively, and that said points form corners of a square with said first point and said second point forming opposite diagonal corners of said square, and said third point and said fourth point forming the other opposite diagonal corners of said square;
   a right isosceles triangular optical prism having a pair of lateral plane face surfaces of equal size which join together at right angles along a common apical edge, said surfaces being coupled together with a hypotenuse face which is parallel to said edge, said hypotenuse face having an area in excess of the area of said square;
   means for orienting said prism so that said hypotenuse face is parallel to said plane, so that a rotational axis drawn through said apical edge and the center of said square is perpendicular to said plane, and so that a line drawn from said first point to said third point is parallel to said apical edge; and
   means for rotating said prism 90° about said rotational axis so said hypotenuse face is parallel to said plane, so that said rotational axis drawn through said apical edge and said center of said square is perpendicular to said plane, and so that a line drawn from said first point to said fourth point is parallel to said apical edge.

2. The apparatus as recited in claim 1 wherein each of said first means, said second means, said third means, and said fourth means comprises an expanded beam connector device having a fiber alignment port, a focusing lens surface, and a reference surface; and wherein all of said reference surfaces are aligned in a common plane.

3. The apparatus as recited in claim 1 wherein said hypotenuse face is antireflection-coated.

4. Optical fiber rotary switching apparatus comprising
   a baseplate having a raised planar surface that is circular about a rotational axis,
      said surface having a first square array of four holes therethrough, centered about said rotational axis,
      said surface having a second square array of four detents thereon, centered about said rotational axis,
      said second square array being larger than said first square array;
   a first optical fiber connector, adapted to be coupled to a first optical fiber, for causing light emerging therefrom to be focused into a first expanded parallel beam along a first central axis; said first connector being so oriented that said first beam passes through one of said four holes;
   a second optical fiber connector, adapted to be coupled to a second optical fiber, for causing light emerging therefrom to be focused into a second expanded parallel beam along a second central axis; said second connector being so oriented that said second beam passes through a second of said four holes; said one hole and said second hole being oriented at opposite diagonal corners of said first square array;
   a third optical fiber connector, adapted to be coupled to a third optical fiber, for causing a third expanded parallel beam of light, along a third central axis, to be focused onto said third optical fiber; said third connector being so oriented that said third beam passes through a third of said four holes;
   a fourth optical fiber connector, adapted to be coupled to a fourth optical fiber, for causing a fourth expanded parallel beam of light, along a fourth central axis, to be focused onto said fourth optical fiber; said fourth connector being so oriented that said fourth beam passes through a fourth of said four holes; said third hole and said fourth hole being oriented at the other opposite diagonal corners of said first square array;

a right isosceles triangular optical prism having a pair of lateral plane face surfaces of equal size which join together at right angles along a common apical edge, said lateral surfaces being coupled together with a hypotenuse face which is parallel to said edge, said hypotenuse face having an area in excess of the area of said first square array;

a cylindrical prism carrier, adapted to rotate about said rotational axis, having a cavity therein for receiving said prism such that said apical edge intersects said rotational axis and such that said hypotenuse face is parallel to said raised surface but not contacting said raised surface; said prism carrier containing a pair of spring-biased balls spaced apart a distance equal to the diagonal of said second square array for alternating engagement with two of said four detents on said raised surface; and an annular shell for fitting about said planar surface and for laterally constraining said prism carrier.

5. The apparatus as recited in claim 4 further comprising a 90° rotary solenoid and a ratchet mechanism such that each excitation of said solenoid causes said prism carrier to rotate 90° and then align itself with said detents on said second array.

6. The apparatus as recited in claim 4 wherein said detents are conical.

7. A solenoid activated optical fiber switch comprising first means for causing light from a first optical fiber to be focused into a first expanded parallel beam along a first central axis;

second means for causing light from a second optical fiber to be focused into a second expanded parallel beam along a second central axis;

third means for causing a third expanded parallel beam of light along a third central axis to be focused onto a third optical fiber, fourth means for causing a fourth expanded parallel beam of light along a fourth central axis to be focused onto a fourth optical fiber;

said first means, said second means, said third means, and said fourth means being so oriented that said first beam, said second beam, said third beam, and said fourth beam are oriented parallel to each other, that said axes are parallel to each other, and that a plane oriented perpendicular to said axes intersects said axes at a first point, a second point, a third point, and a fourth point, respectively, and that said points form corners of a square with said first point and said second point forming opposite diagonal corners of said square, and said third point and said fourth point forming the other opposite diagonal corners of said square;

a right isosceles triangular optical prism having a pair of lateral plane face surfaces of equal size which join together at right angles along a common apical edge, said surfaces being coupled together with a hypotenuse face which is parallel to said edge, said hypotenuse face having an area in excess of the area of said square; and a 90° rotary solenoid, coupled to said prism, for rotating said prism to aligned states where said apical edge is parallel to alternate sides of said square.

* * * * *